_United States Patent Office_

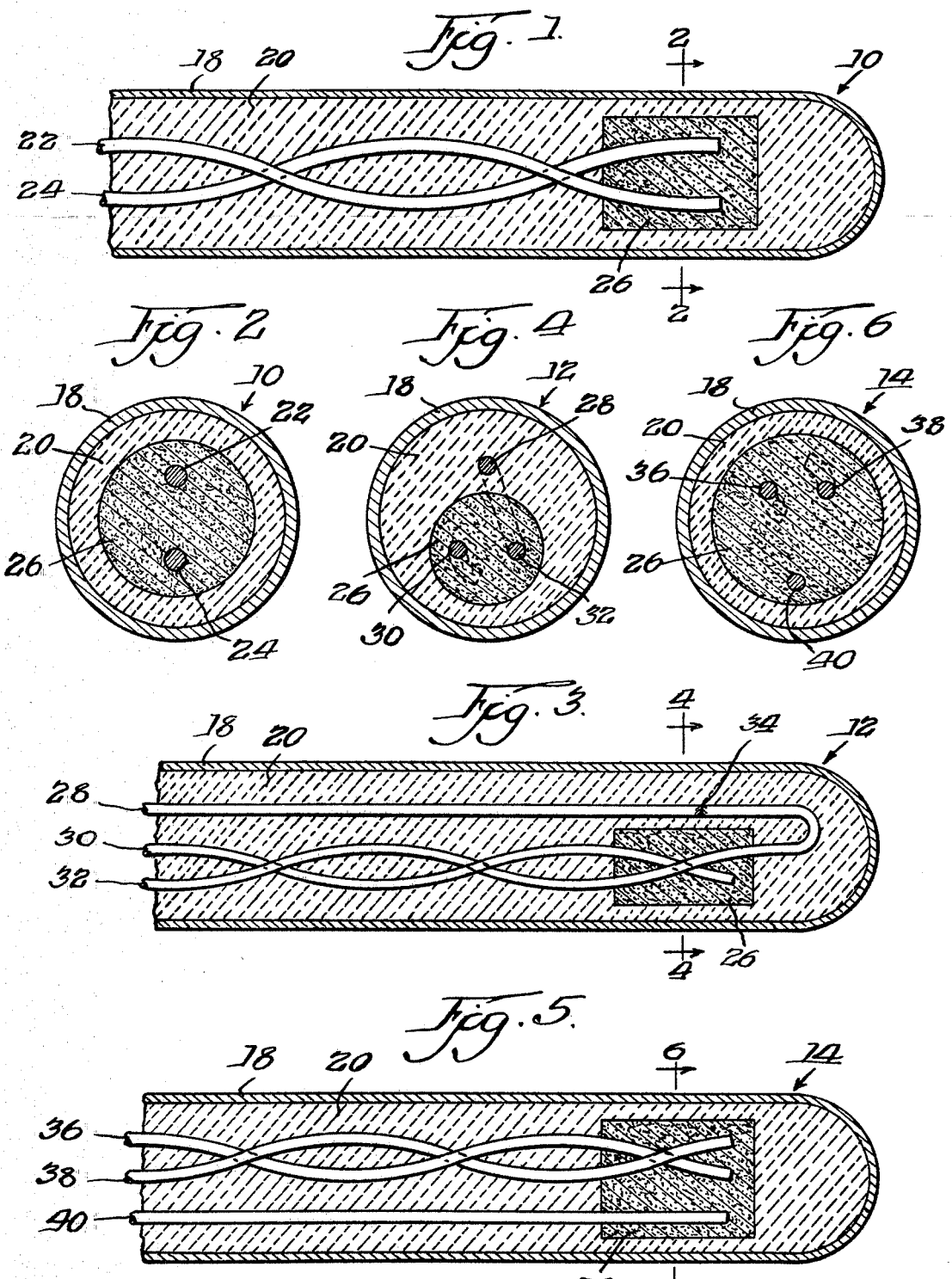

3,513,432
Patented May 19, 1970

3,513,432
**SHIELDED THERMOELECTRIC TRANSDUCER/
CONDUCTOR CONSTRUCTION**
Bayard C. Davis, Lombard, Ill., assignor to Continental Sensing, Inc., Melrose Park, Ill., a corporation of Illinois
Filed Feb. 10, 1969, Ser. No. 797,799
Int. Cl. H01c 7/04; G01k 7/22
U.S. Cl. 338—28              6 Claims

ABSTRACT OF THE DISCLOSURE

A shielded conductor for use as a thermoelectric transducer and/or temperature-responsive sensor. A metallic sheath surrounds a mass of compacted ceramic insulating material. Embedded within the mass is a short plug of semiconductive material having an inverse temperature-resistance characteristic. Three spaced wires, one thermoelectrically dissimilar to the other two, are embedded within the insulating material and teminate in the semiconductive plug. The conductor provides two means for sensing the temperature in its vicinity. Since the resistance of the semiconductive material varies inversely with temperature, the temperature may be sensed by determining the resistance between the similar wires. In addition, since the semiconductive material permits the formation of a thermoelectric junction, the temperature may be sensed by determining the thermoelectric voltage resulting between the dissimilar wire and either of the pair of similar wires. The conductor may be alternatively constructed so that the dissimilar wire does not pass through the semiconductive plug. In such a case, the end of the dissimilar wire is physically joined to the end of one of the similar wires, to form a thermoelectric junction outside the plug. The wires in either case may be helically wrapped to suppress extraneous signals.

BACKGROUND—SUMMARY—DRAWINGS

This invention relates to shielded conductors and, more particularly, to an improved shielded conductor construction capable of functioning as a thermoelectric transducer and as a thermister sensor to enable simultaneous temperature sensing and control functions.

Continuous thermoelectric transducers which are characterized by the use of semiconductive materials having inverse temperature-resistance characteristics in conjunction with dissimilar thermocouple wires are now well known in the art. Such constructions are particularly suitable where it is desired to monitor the greatest temperature existing along the length of the transducer. One such conductor construction which finds use as a thermoelectric transducer in connection with a system for measuring and locating temperature conditions of interest is disclosed and claimed in U.S. Pat. No. 3,408,607, issued Oct. 29, 1968. Also known are continuous thermistor conductors. The most satisfactory forms of these devices employ a continuous core of semiconductive material surrounded by a mass of temperature-resistant electrically-insulating material, which is in turn surrounded by a protective metallic sheath. The insulating material serves to give the conductor structure heat resistance and strength, and prevents the conductive wires, including any which may be embedded in the semiconductive core, from forming electrical junctions with the sheath.

Due to the relatively high cost of the semiconductive material, however, such constructions have proved to be too expensive for certain applications. In addition, such constructions have typically lacked the ability to perform both sensing and control functions when operating as a thermoelectric transducer. It has now been found that, by constructing a conductor in accordance with the present invention, there can be produced a less expensive transducer device having a more linear response to temperature, and having the ability to service both sensing and control instruments.

In accordance with the present invention, there is provided an improved shielded conductor comprising a tubular sheath which is filled with a mass of densely-compacted high temperature-resistant electrically-insulating material. Embedded within the insulating material is a relatively short plug of semiconductive material having a negative temperature coefficient of resistance. The plug of semiconductive material may be positioned at any desired location along the length of the conductor, but for most applications this location will be near the closed end of the sheath. A pair of wires are also embedded within the insulating material and are maintained therein in spaced relation along the length of the conductor. These wires, which are formed of similar electrically conductive material, either terminate in or pass through the plug of semiconductive material. Inasmuch as the semiconductive material exhibits an inverse temperature-resistance characteristic, the resistance of the electrical path between the two wires across the semiconductive plug will be inversely proportional to the temperature of the material. Thus, the temperature in the immediate vicinity of the semiconductive plug can be sensed, and with suitably calibrated instruments, measured, by determining the resistance of the semiconductive junction between the two wires or by measuring the voltage drop across the two wires in response to supplied electrical energy. Alternatively, the two wires can be used to initiate a control function, as for example a fire extinguisher, a thermostatic mechanism, a warning signal, etc., by preselecting a minimum resistance corresponding to a maximum temperature and using this resistance to condition a control signal.

The conductive wires may alternatively be formed of thermoelectrically dissimilar materials capable of forming a thermoelectric junction. The semiconductive nature of the plug permits the establishment of a thermoelectric junction between the wires, resulting in a Seebeck voltage directly proportional to the temperature of the plug. This thermoelectric voltage can be used to monitor the temperature, or to initiate a control function.

It is often desirable to provide for simultaneous control and sensing or measurement functions. Accordingly, the present invention contemplates the employment of a third conductive wire which is formed of a material dissimilar to that of the two similar wires, so that thermoelectric junctions may be established between the third wire and either or both of the other two wires. The third wire like the other two, is embedded within the insulating material in spaced relation to the other two wires. In one form of the invention, a thermoelectric junction is established by physically joining one end of the third wire to one end of one of the other two wires. In such a case, the third wire does not come into contact with the semiconductive plug, and the other wire to which it is joined emerges from the plug so that the thermoelectric junction is established outside the plug. Alternatively, the third or dissimilar wire may be, like the pair of similar wires, confined for a portion of its length within the semiconductive plug. In this case, there need be no physical junction between the third wire and either of the other two wires, since the semiconductive material permits the formation of thermoelectric junctions thereacross. Here again, as in the case of the pair of similar wires, the employment of the third wire with one of the pair of other wires can provide either temperature measuring or control functions, so that the conductor can simultaneously be employed in both modes.

It has been found that a conductor constructed with the foregoing features is less expensive than prior constructions, and exhibits a remarkable temperature-resistance linearity. In addition, such a conductor is particularly adapted for use as a thermoelectric transducer and thermistor sensor where it is desired to simultaneously service both measurement and control circuitry. These and other features and advantages of the present invention will be more fully appreciated by considering the remainder of the specification and the claims, with illustrative reference to the drawing, in which:

FIG. 1 is a longitudinal sectional view of a conductor constructed in accordance with the present invention;

FIG. 2 is a cross-sectional view taken on the line 2—2 of FIG. 1;

FIG. 3 is a view similar to FIG. 1, showing a modified conductor construction;

FIG. 4 is a cross-sectional view taken on the line 4—4 of FIG. 3;

FIG. 5 is a view similar to FIG. 1, showing a preferred form of conductor construction; and FIG. 6 is a cross-sectional view taken on the line 6—6 of FIG. 5.

DESCRIPTION OF EXEMPLARY EMBODIMENT

For purposes of illustration, the present invention will be described in the context of a system for monitoring and/or controlling the temperature at a given point of interest in an environment. In such systems, the improved shielded conductor may be used as a continuous sensor, as a control element, or both. When used as a sensor, the conductor may be adapted for use with suitably calibrated instrumentation to provide a continuous indication of the temperature at the point of interest in the environment. When employed as a control element, the conductor may be adapted to provide an initiating signal to or to condition a signal from suitable control circuitry and mechanisms when the temperature at the point of interest is above or below a preselected value. For example, the conductor might be used to monitor the temperature at a certain point in a nuclear reactor. In such a case, the conductor could, with appropriate associated circuitry and instrumentation, continuously measure the temperature at that point and, at the same time, provide signals for controlling the temperature or for operating safety or warning devices.

A shielded conductor constructed in accordance with the invention is illustrated in FIGS. 1 and 2. The conductor, which is generally indicated by the reference numeral 10, includes a cylindrical sheath 18 which is filled with a mass of insulating material 20. Embedded in the material 20 are a pair of conductive wires 22 and 24. The sheath 18 is preferably formed of a suitable protective material such as stainless steel. The insulating material 20, which is resistant to high temperatures (e.g., magnesium oxide), is densely compacted within the sheath 18 and serves to maintain the wires 22 and 24 in spaced relation from one another and from the sheath along the length of the conductor 10. The conductor 10 also includes a relatively short plug of semiconductive material 26 characterized by a negative temperature coefficient of resistance (e.g., a composite of manganese, in principal part, silicon, lead, aluminum, barium, and other minor constituents). The plug 26 surrounds and intimately confines the wires 22 and 24 for a portion of their lengths.

The wires 22 and 24 may be formed of the same or similar conductive materials, or may alternatively be formed of thermoelectrically dissimilar materials (e.g., Alumel and Chromel). Assuming that the wires 22 and 24 are formed of thermoelectrically similar materials, it will be understood that the resistance between them across the plug of semiconductive material 26 will vary inversely with the temperature of the plug, due to the inverse temperature-resistance characteristic of the semiconductive material. Thus, through the use of suitably calibrated instruments connected to the wires, 22 and 24, the resistance between the wires can be monitored to yield a direct indication of the temperature in the vicinity of the conductor 10 near the plug 26. Alternatively, the wires 22 and 24 could be connected to suitable control circuitry and mechanisms to initiate a control or warning function when the resistance between the wires reaches a predetermined minimum (or maximum) value, thus indicating a predetermined maximum (or minimum) temperature in the vicinity of the plug 26.

In addition, the conductor 10 can be used in connection with either of the foregoing measurement or control functions if the wires 22 and 24 are formed of dissimilar materials capable of forming a thermoelectric junction. Because of the semiconductive nature of the material forming the plug 26, thermoelectric junctions can be established between the wires 22 and 24 across the plug material. Thus, again with the use of suitably calibrated instrumentation, the Seebeck voltages representative of temperature conditions in the vicinity of the plug 26 can be monitored to yield an indication of those temperatures. Alternatively, as in the case where the wires 22 and 24 are of the same or thermoelectrically similar materials, the wires may be connected to suitable control instrumentalities to initiate a control function when the Seebeck voltage reaches a predetermined maximum (or minimum), thus indicating a predetermined maximum (or minimum) temperature of interest.

The plug of semiconductive material 26 may be placed at any desired location along the length of the conductor 10 although, as shown in FIG. 1, this will normally be near the closed end of the conductor. The plug 26 can be quite short; for example, a plug of semiconductive material having an axial dimension of less than one-half inch might well be employed in a conductor many feet long. This feature results in substantial savings over conventional continuous thermocouples and thermistor sensors, not only in the cost of relatively expensive semiconductive material, but in ease of construction. It should be understood that the length of the plug 26 may be varied over wide limits, depending upon the intended use of the conductor 10. For example, there might be a critical area of only a foot or so in an environment, although the conductor might be required to pass through many feet of high temperature environment to reach that area. In the past, using continuous thermocouples or continuous thermistor sensors, the entire length of the conductor would have a core of semiconductive material. Under the present invention, however, the plug 26 of the conductor 10 could be made to coincide with the dimensions of the critical area only, and could still provide continuous monitoring and/or control of the highest temperature in the area.

FIGS. 3 and 4 illustrate a modified form of conductor 12 embodying the features of the present invention. As in the case of the conductor 10, the conductor 12 includes an outer tubular sheath 18 which is filled with a mass of densely-compacted, high temperature-resistant electrically-insulating material 20, such as MgO, and a short plug of semiconductive material 26 having an inverse temperature-resistance characteristic. The conductor 12 further includes three conductive wires 28, 30 and 32. As can be seen, the pair of wires 30 and 32 are confined by the plug of semiconductive material 26 for a portion of their lengths, while the other wire 28 is embedded only in the insulating material 20 and does not make contact with the plug. In this form of the invention, the pairs of wires 30 and 32 are both of the same or similar materials (e.g., Chromel), while the third wire 28 is of a material which is thermoelectrically dissimilar (e.g., Alumel) from that of the pair.

One of the wires of the similar pair (in this case, the wire 32) emerges from the plug 26 and is physically joined (as by welding or other suitable means) to the end of the dissimilar wire 28, creating a thermoelectric junction 34 outside the semiconductive material of the plug. Constructed in this fashion, the conductor 12 can be used simultaneously in conjunction with both measurement and control instrumentalities to monitor the temperature in an environment. Because the wires 28 and 32 are of thermoelectrically dissimilar materials, a Seebeck voltage will appear therein which is directly proportional to the temperature in the vicinity of the thermoelectric junction 34. And because the semiconductive plug 26 exhibits a negative temperature coefficient of resistance, the resistance between the similar wires 30 and 32 will be inversely proportional to the temperature in the vicinity of the plug. Thus, the similar pair of wires 30 and 32 might be used to provide a continuous indication of temperature, while the dissimilar pair 32 and 28 is simultaneously used to provide a control signal. Alternatively, the similar wires 30 and 32 might be employed to condition a control signal, while the dissimilar wires 32 and 28 are used to provide a signal indicative of temperature.

FIGS. 5 and 6 illustrate a preferred embodiment of the present invention. As shown therein, the conductor 14, like the conductors 10 and 12, comprises a sheath 18, a mass of insulating material 20, and a plug of semiconductive material 26. The conductor 14 also includes three conductive wires 36, 38 and 40, all of which are embedded in and confined for a portion of their lengths by the plug 26. In this case, the wires 36 and 40 might be of thermoelectrically similar materials (e.g., Alumel) while the third wire 38 is of a dissimilar material (e.g., Chromel). Because of the semiconductive nature of the plug 26, an effective thermoelectric junction is established between the dissimilar pair 38 and 40 (or 38 and 36), while a resistance inversely proportional to the temperature of the plug exists between the similar pair 36 and 40. Since both of the dissimilar wires 38 and 40 (or 38 and 36) are confined for a portion of their lengths in the plug 26, there is no need for a physical connection therebetween in order to establish a thermoelectric junction. The dissimilar and similar pairs of wires in the conductor 14 may be employed as described above in connection with the conductor 12 to provide simultaneous measuring and control functions.

It will be noted that the wires 22 and 24 in the conductor 10 are helically wrapped or intertwisted in a generally uniform manner along the length of the conductor, as are the similar pair 30 and 32 in the conductor 12 and the dissimilar pair 36 and 38 in the conductor 14. This feature serves to suppress noise and other extraneous signals. In three-wire constructions, such as the conductors 12 and 14, all three wires are preferably maintained in helically-wrapped spaced relation. For purposes of clarity, however, the conductors 12 and 14 have been illustrated with only two of the wires in that configuration.

Although an embodiment constructed in accordance with the present invention has been described with the requisite particularly, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

What is claimed is:

1. A shielded conductor comprising: an elongate outer protective sheath; a mass of densely-compacted high temperature-resistant electrically-insulating material filling said sheath; a relatively short plug of semiconductive material embedded in said insulating material at a selected location along the length of said conductor, said semiconductive material having an inverse temperature-resistance characteristic; and three conductive wires embedded in said insulating material and maintained thereby in spaced relation from one another and from said sheath along the length of said conductor, a pair of said wires being formed of similar materials and the third of said wires being formed of a dissimilar material capable of forming a thermoelectric junction with either of said pair, at least said pair of wires being embedded for a portion of their length within said plug of semiconductive material.

2. A conductor in accordance with claim 1, wherein each of said three wires is embedded for a portion of its length within said plug.

3. A conductor in accordance with claim 1, wherein said third wire is not embedded within said plug and wherein one wire of said pair is physically joined at one end to one end of said third wire to provide a thermoelectric junction outside said plug.

4. A conductor in accordance with claim 3, wherein said thermoelectric junction is located near said plug.

5. A conductor in accordance with claim 1, wherein at least two of said wires are maintained in helically-wrapped spaced relation.

6. A conductor in accordance with claim 1, wherein all of said wires are maintained in helically-wrapped spaced relation.

References Cited

UNITED STATES PATENTS

| | | | |
|---|---|---|---|
| 2,837,618 | 6/1958 | Gildart | 338—28 |
| 3,016,506 | 1/1962 | Rakowski et al. | 338—22 |
| 3,249,988 | 5/1966 | Sapoff | 338—28 X |
| 3,408,607 | 10/1968 | Davis | 338—26 |

RICHARD A. FARLEY, Primary Examiner

H. C. WAMSLEY, Assistant Examiner

U.S. Cl. X.R.

73—362; 338—26